United States Patent [19]

Tuminello

[11] Patent Number: 5,290,846
[45] Date of Patent: Mar. 1, 1994

[54] SOLVENTS FOR FLUORINATED POLYMERS

[75] Inventor: William H. Tuminello, Newark, Del.

[73] Assignee: E. I. Du Pont de Nemours and Company, Wilmington, Del.

[21] Appl. No.: 935,352

[22] Filed: Aug. 28, 1992

[51] Int. Cl.$^5$ .................. C08K 5/17; C08K 5/02
[52] U.S. Cl. .................. 524/463; 524/236; 524/288; 524/366
[58] Field of Search ........... 524/463, 366, 236, 288; 521/44.5

[56] References Cited

U.S. PATENT DOCUMENTS

| | | | |
|---|---|---|---|
| 3,041,317 | 6/1962 | Gibbs et al. | 526/250 |
| 4,266,036 | 5/1981 | Baczek et al. | 521/26 |
| 4,272,560 | 6/1981 | Baczek et al. | 427/58 |
| 4,298,697 | 11/1981 | Baczek et al. | 521/27 |
| 4,535,112 | 8/1985 | McCain et al. | 524/233 |
| 4,540,716 | 9/1985 | Covitch et al. | 521/28 |
| 4,650,551 | 3/1987 | Carl et al. | 204/59 |
| 4,698,243 | 10/1987 | Carl et al. | 427/341 |
| 4,778,723 | 10/1988 | Carl et al. | 428/394 |
| 4,784,900 | 11/1988 | Carl et al. | 428/265 |
| 4,808,651 | 2/1989 | Blickle et al. | 524/366 |
| 4,950,724 | 8/1990 | Malanga et al. | 526/144 |
| 5,066,682 | 11/1991 | Miyazaki et al. | 521/31 |

FOREIGN PATENT DOCUMENTS

| | | | |
|---|---|---|---|
| 80/54096C/31 | 6/1980 | Japan | B01J 39/18 |
| 81/04932D/-04 | 6/1981 | Japan | B01J 47/12 |
| 82/10578J/51 | 7/1982 | Japan . | |
| 82/09909J/51 | 11/1982 | Japan | C08L 27/12 |
| 82/09910J/51 | 11/1982 | Japan | C08L 27/12 |
| 89/011183/02 | 11/1988 | Japan | C08J 5/22 |

OTHER PUBLICATIONS

Article "Solubility Characteristics of Perfluorinated Polymers with Sulfonyl Fluoride Functionality" by G. H. McCain and M. J. Covitch, J. Electrochem. Soc.: Electrochemical Science and Technology (Jun. 1984) pp. 1350-1352.

Primary Examiner—Joseph L. Schofer
Assistant Examiner—Jeffrey T. Smith
Attorney, Agent, or Firm—Cary A. Levitt

[57] ABSTRACT

Perfluorinated cycloalkanes, perfluorinated aromatic compounds and perfluorotrialkyl amines having a critical temperature greater than 150° C. are solvents for certain carboxylic fluorinated polymers having an equivalent weight greater than 900 and dissolve the polymers more readily and completely at low temperatures than previously known solvents. A process for dissolution of the polymers and the solutions that are formed is disclosed. The solutions are useful for making polymer films and ion exchange membranes, particularly membranes for use in chloroalkali cells or fuel cells.

5 Claims, No Drawings

SOLVENTS FOR FLUORINATED POLYMERS

BACKGROUND OF THE INVENTION

1. Field of the Invention

Novel perfluoro cycloalkane, perfluorinated aromatic compounds and perfluorotrialkyl amine solvents for dissolving fluorinated polymers having carboxyl groups and an equivalent weight greater than 900 are disclosed. The solvents have a critical temperature greater than 150° C. Also disclosed are solutions of the polymers in the solvents, and a process for forming the polymer solution.

2. Technical Background

This invention concerns novel solvents for dissolving certain alkyl carboxylate forms of fluorinated polymers which are copolymers of tetrafluoroethylene ("TFE") and certain perfluorovinylether comonomers. The solvents readily dissolve such polymers more completely and at lower temperatures than previously disclosed solvents, an advantage in equipment utilization and other manufacturing concerns. Solutions of the polymers are particularly useful for preparing ion exchange membranes, including membranes for use in an electrolytic cell such as a chloralkali cell or a fuel cell.

The prior art generally discloses the solubility of certain fluorinated polymers but there is no mention of full solutions of carboxylic fluorinated polymers having high equivalent weights in this class of inventive solvents, particularly at low temperatures.

Some solvents are known in the prior art for this class of carboxylic fluorinated polymers; however, some of the solvents are very expensive or require high temperature to dissolve the polymer. The prior art teaches solvents for carboxylic fluorinated polymers with equivalent weights below about 900 and solvents for such polymers which require elevated temperatures or pressures. There is no teaching of a solvent for the ester form of carboxylic fluorinated polymers with an equivalent weight greater than 900 at low temperatures.

For example, U.S. Pat. Nos. 4,650,551; 4,778,723 and 4,784,900 disclose solutions near room temperature of highly swollen dispersions of resins which are copolymers of TFE and perfluorovinylether comonomers with acidic end groups having low equivalent weights less than 850. Heavily fluorinated alkanes, like 1,2-dibromotetrafluoroethane and 1,1,2-trichlorotrifluoroethane were used as "solvents". Examples of room temperature solutions were also given using polyhalogenated alkyl ethers with boiling points less than 190° C.; the equivalent weight for these resins was exceedingly low at 690 or lower.

Fluorinated polymer resins commercially known as Nafion ® (available from E. I. du Pont de Nemours and Company) with an equivalent weight greater than about 1000, must be dissolved at elevated temperatures and pressures due to the presence of crystallinity. U.S. Pat. Nos. 4,266,036; 4,272,560 and 4,298,697 discuss the use of high boiling perhalogenated alkyl ethers and perhalogenated alkanes as solvents at elevated temperatures. The examples describe the dissolution of 1050 to 1200 equivalent weight resins in oligomers of chlorotrifluoroethylene ("CTFE") at temperatures of about 225° to 250° C.; however, the polymers are more likely to decarboxylate at high temperatures. Chemical degradation of the polymer may occur in solutions of CTFE oligomer at 200° C.

U.S. Pat. No. 4,535,112 describes dispersions or partial solutions of 1050 to 1200 equivalent weight polymers in a wide variety of heavily fluorinated liquids for purposes of repairing cation exchange membranes. These liquids include perfluorodecanoic acid, perfluorotributylamine, pentafluorophenol, pentafluorobenzoic acid, perfluoro-1-methyldecalin and decafluorobiphenyl. There is no mention of full solutions of carboxylic fluorinated polymers having high equivalent weights at low temperatures.

An article entitled "Solubility Characteristics of Perfluorinated Polymers with Sulfonyl Fluoride Functunality" by McCain and Covitch discusses the solubility of so-called sulfonyl fluorinated polymers, but does not mention alkyl carboxylate forms of fluorinated polymers.

SUMMARY OF THE INVENTION

This invention concerns a process for dissolving alkyl carboxylate forms of fluorinated polymers comprising contacting a solvent which is a perfluorinated cycloalkane, perfluoroinated aromatic or perfluorotrialkylamine with the above-mentioned fluorinated polymer at a high enough temperature and for a sufficient amount of time to dissolve the polymer. Solutions were obtained at about 150° C. at autogenous pressure and some of the solutions were stable at room temperature. Also, the inventive solvents are non-toxic, non-flammable, inert, relatively inexpensive and easy to handle.

This invention also concerns a composition comprising a solution of the fluorinated polymer dissolved in the solvent.

DETAILS OF THE INVENTION

The polymers useful herein are fluorinated, which means that at least 90%, preferably at least 95%, and most preferably all of the atoms attached to the carbons are F atoms or side-chain ether groups, which may contain functional groups hydrolyzable to salts. The non-fluorine atoms, if used, may be H, Cl or Br. The fluorinated polymers are the so-called carboxyl polymers and are in the methyl ester form.

The carboxyl polymers have a fluorinated hydrocarbon backbone chain to which are attached side chains carrying, before hydrolysis to the salt form, certain functional groups hydrolyzable in an alkaline medium to carboxylate groups, such as nitrile or ester groups. These polymers include, e.g., those containing the —$(OCF_2CFY)_n$—O—$CF_2$—$CF_2$—W side chain, where Y is F or $CF_3$; n is 0, 1 or 2; and W is COOR or —CN, where R is lower alkyl. Among these polymers, those with n=1 and Y=$CF_3$ are preferred. The carboxylic polymers may be treated with a material such as trimethylorthoformate or methanol to insure complete conversion to the ester form.

Preferably, the fluorinated polymers are stored under vacuum in a dessicater to prevent hydrolysis by atmospheric moisture. The resins should be removed from the dessicater just prior to use.

Polymerization can be carried out by the methods well known in the art. Especially useful is solution polymerization using 1,2,2-trichlor-2,1,1-trifluoroethane as the solvent and perfluoropropionyl peroxide as the initiator. Polymerization can also be carried out by aqueous granular polymerization. All of these polymers are known to those skilled in the art, and many are items of commerce.

Compounds useful herein as solvents are perfluorinated cycloalkanes, perfluorinated aromatic compounds and perfluorotrialkylamines. Such solvents must have a critical temperature above about 150° C.

Perfluorinated cycloalkanes are saturated cyclic compounds, which may contain fused or unfused rings. The cycloalkane compounds may be substituted by perfluoroalkyl and perfluoroalkylene groups. Perfluoroalkyl groups are a saturated branched or linear carbon chain. Perfluoroalkylene group are an alkylene group which is branched or linear and connects two different carbocyclic rings. The total number of carbon atoms in all of the perfluoroalkyl and perfluoroalkylene groups in a moleculer of the solvent are preferably less than the total number of carbon atoms in the carbocyclic rings of the solvent molecule. It is preferred if there are at least twice as many carbon atoms in the rings of the solvent molecule as there are atoms in the perfluoroalkyl and perfluoroalkylene groups. Perfluorinated aromatic compounds are similar to perfluorocyclic alkanes, provided that one or more of the constituents is a phenyl group. The perfluorinated aromatic compounds may also be sutsituted with perfluoroalkyl groups or perfluoroalkylene groups. Perfluorotrialkyl amines include, for example, perfluorotrihexyl amine.

In order to ensure that the solvent will actually dissolve the polymer, the critical temperature of the solvent should be about 150° C. or higher, preferably about 180° C. or higher.

Compounds useful as solvents herein include, but are not limited to, hexafluorobenzene, perfluoromethylcyclohexane, perfluorodecalin, perfluorotetradecahydrophenanthrene, and perfluorotrihexylamine, preferably perfluorotetradecahydrophenanthrene. It is believed that perfluorotetradecahydrophenanthrene is the best solvent for the carboxylic fluorinated polymers because it had a sufficiently high critical temperature (and boiling point) to readily dissolve the polymers at atmospheric pressure.

The process of dissolving the fluorinated polymer is carried out at the temperature required to dissolve the polymer. One may use atmospheric or autogenous pressure. The minimum temperature required can be determined by simple experimentation and will vary with the polymer and solvent. Generally, lower melting polymers will require lower temperatures, while higher melting polymers will require higher temperatures. Useful temperatures are illustrated in the Examples. The temperature must not be above the critical temperature of the solvent, so the critical temperature of the solvent must be above the temperature of dissolution.

In the present process, the solvent and fluorinated polymer must be stable at the process temperature. For example, exposure of the hot polymer to active metals such as aluminum may cause polymer decomposition. Stirring or other forms of agitation will increase the rate of dissolution of the polymer. Other factors which influence the rate of dissolution and their effect are: higher interfacial surface area between the polymer and solvent gives faster rates, and higher polymer molecular weight and higher polymer concentrations give slower rates of dissolution. Dissolution will also generally be faster when the initial polymer is more finely divided. The time required for dissolution will vary with the particular polymer and solvent chosen, the temperature, the pressure as well as the other factors discussed above, but generally will be in a the range of a few minutes to a few hours. Dissolution can be followed visually. As discussed above, dissolution of the described polymers in the solvents of the instant invention is faster and more complete than in solvents previously known for these polymers.

The polymer concentration in solution is generally about 1 to 5 percent by weight, but the higher the molecular weight of the polymer, the more difficult it is to make relatively concentrated solutions due to longer dissolution times and higher solution viscosity. Preferred ingredients for the process are the same as given for the solution composition above.

Solutions of the fluorinated polymers are useful for determining molecular weight distributions of the polymer to better control plant manufacture. The classical methods for polymer molecular characterization rely on dilute solutions. For example, molecular weight distribution is usually determined by size exclusion chromatography which relies on other dilute solution techniques for calibration to get absolute values. The polymer is fed to the chromatograph in dilute solution. Calibration can include osmometry, light scattering and intrinsic viscosity measurements. Until now, it has not been possible to make an inexpensive, non-toxic, fully dissolved solution of these fluorinated polymers at atmospheric pressure and low temperature for purposes of measuring molecular weight distributions.

Solutions of the fluorinated polymers are also useful for making ion exchange membranes or films which are useful in the operation of electrolytic cells, such as chloralkali cells and fuel cells.

GENERAL PROCEDURE

Unless otherwise noted, Examples and Comparative Examples were carried out in the following way. Borosilicate glass tubes 8 mm OD with a 1 mm wall were sealed at one end and then the solvent and polymer were added. The relative amounts of polymer and solvent were such so as to provide a 1 to 5% solution by weight of the polymer (see individual Examples). Enough solvent and polymer were added so that when the tubes were sealed with final lengths of 7.5–10 cm, about one-half of the tube contained liquid. The tubes were then placed in holes in an aluminum block that was suitably heated and insulated. Other holes in the block allowed observation of the tube. The temperature of the block could be controlled to $\pm 0.5°$ C.

If the polymer eventually dissolved, the following was observed. Initially the free flowing, solid, opaque polymer particles in the liquid solvent were observed. The temperature of the tube was increased about 1° C./min. The temperature at which complete dissolution occurred ($T_D$) was recorded.

Once dissolution occurred, cooling was undertaken in 5° C. increments. By observing when crystallites formed the crystallization temperature ($T_C$) of the polymer from solution was determined. The true melting point of the mixture was determined by reheating in 5° C. increments and observing the temperature at which the mixture once again becomes transparent and free flowing ($T_I$). Upon repeated reheating and cooling $T_I$ and $T_C$ were reproducible. The polymer was in the form of finely divided grains (approximately 1 mm diameter) and at $T_D$ went into solution almost instantly for the best solvents. $T_C$ and $T_I$ were usually determined by observing the onset or disappearance of turbidity. Most times turbidity was difficult to observe; in 5% solutions, these points could also be estimated by observing the temperature at which large viscosity increases ($T_C$) or decreases ($T_I$) were seen.

EXAMPLES

These Examples and Comparative Examples were carried out using the General Procedure.

Table 1 is a legend which lists the solvents used in the Examples and the Comparative Examples, along with their chemical formula and critical temperature. The solvents are commercially available.

TABLE 1
LEGEND

| Chemical Name | Formula | Critical Temp. (°C.) |
|---|---|---|
| perfluoro-n-pentane | n-$C_5F_{12}$ | 29 |
| perfluoro-n-octane | n-$C_8F_{18}$ | 100 |
| perfluoro-n-eicosane | n-$C_{20}F_{42}$ | 300 |
| hexafluorobenzene | $C_6F_6$ | 244 |
| perfluoromethylcyclohexane | $C_7F_{14}$ | 210 |
| perfluorodecalin | $C_{10}F_{18}$ | 293 |
| perfluorotetradecahydrophenanthrene | $C_{14}F_{24}$ | 377 |
| hexafluoropropylene oxide oligomer | $(C_3F_6O)_n$ | 400 |
| chlorotrifluoroethylene (CTFE) oligomer | $(C_2ClF_3)_n$ | 400 |
| perfluorotrihexylamine | $(C_6F_9)_3N$ | >300 |

EXAMPLE 1

Perfluorotetradecahydrophenanthrene was used successfully as the solvent in the manner described in the General Procedures. The effects on solutions of varying equivalent weight and concentration carboxyl fluorinated resins are listed in Table 2. The resins completely dissolved in the solvent at the temperatures indicated in Table 1. $T_D$, $T_C$, and $T_I$ generally show a tendency to increase with increasing equivalent weight. This trend is expected because TFE concentration is increasing with equivalent weight; therefore, the concentration of larger crystallites also increases. This means that there should be a larger concentration of higher melting crystals with increasing equivalent weight. Surprisingly, carboxyl resins do not show this same tendency in perfluorotetradecahydrophenanthrene. $T_D$, $T_C$, and $T_I$ for the carboxyl resins listed in Table 2, if anything, tend to be lowest for the highest equivalent weight resin. It is believed that these values must again increase at higher equivalent weight values as 100% TFE concentrations in the resin is approached. Thus, a minimum in these properties is a function of low equivalent weight. Although the precise mechanism is not known, it is believed that the carboxylate groups are chemically changing at the solution temperatures to lessen polymer-solvent interactions. These effects would obviously be more prominent at higher carboxylate (lower equivalent weight) concentrations and work against the reduction of crystallinity in promoting solubility.

TABLE 2

| Equivalent Weight | $T_D$ (°C.) | $T_C$ (°C.) | $T_I$ (°C.) | Concentration (wt. percent) |
|---|---|---|---|---|
| 1025 | 180 | 130 | 155 | 1 |
| 1050 | 185–195 | 125 | 155–160 | 1 |
| 1050 | 175 | 130 | 150 | 5 |
| 1150 | 175 | ~50 | ~100 | 1 |
| 1150 | 180 | 125 | 143 | 5 |

COMPARATIVE EXAMPLE 1

The solvents listed in Table 3 were used to attempt to dissolve the carboxyl resin having an equivalent weight of 1150. The resin was insoluble in hexafluoropropylene oxide oligomer and exhibited poor solvency properties in CTFE oligomer and had good solvency properties in perfluorotrihexylamine.

TABLE 3

| Solvent | $T_C$ (°C.) | $T_I$ (°C.) |
|---|---|---|
| CTFE oligomer | 210 | 250 |
| perfluorotrihexylamine | 190 | 190 |
| $(C_3F_6O)_n$ | insoluble | insoluble |

EXAMPLE 2

Carboxyl resin having an equivalent weight of 1150 were sought to be dissolved in lower boiling perfluorocarbons all having lower molecular volumes than $C_{14}F_{24}$. The objective was to find solvents which would result in lower $T_D$, $T_I$ and $T_C$ than those of $C_{14}F_{24}$, because it is known that solvents with lower molecular volume often give solutions with lower melting points. The liquids investigated were n-$C_5F_{12}$, n-$C_8F_{18}$, $C_6F_6$, $C_7F_{14}$, and $C_{10}F_{18}$. The polymer concentration was 5%. Some degree of solubility was displayed by all these liquids. $C_{14}F_{24}$ formed a homogeneous free-flowing mixture at 185° C. Upon cooling, the solution turned to a non-flowing gel at about 130° C. Upon reheating, the gel remelted at 150° C. to a free-flowing liquid. n-$C_5F_{12}$ and n-$C_8F_{18}$ were not successful solvents at low temperatures. Swelling occurred in both the perfluoro-n-alkanes but was more prominent in the higher boiling perfluorooctane. The maximum temperature reached with the n-alkanes was 160° C. Solution behavior was similar for the doubly fused-ringed perfluorodecalin ($C_{10}F_{18}$) as for the triply fused-ringed $C_{14}F_{24}$. Only slight swelling was observed for the single-ring case of perfluoromethylcyclohexane ($C_7F_{14}$) heated to 160° C., maximum. Because the perfluorodecalin boils at 142° C., solubility could be attained under modest pressure at 180° C. and maintained below its boiling point to about 130° C. Thus, atmospheric pressure solutions would be possible after initially dissolving under pressure. The hexafluorobenzene solutions might be stable at the lowest temperatures. There is no doubt that above 120° C. a free-flowing solution is obtained with only a minute fraction of material stuck to the tube wall as tiny gel particles. These particles would not dissolve as high as 185° C. In $C_{14}F_{24}$ and $C_{10}F_{18}$ most of the mixture is no longer gel and is free-flowing at about 140° C. A slight amount of turbidity remained above 140° C., which disappeared at higher temperatures. The $C_6F_6$ solutions were never turbid, even as non-flowing gels. Disregarding the small amount of insolubles, $C_6F_6$ solutions would only be stable under pressure because $T_C$ (106° C.) is well above the solvents's boiling point (80° C.). The solution properties of these solvents are listed in Table 4.

TABLE 4

| Solvent | $T_D$ (°C.) | $T_C$ (°C.) | $T_I$ (°C.) |
|---|---|---|---|
| $C_{14}F_{24}$ | 175 | 130 | 150 |
| $C_{10}F_{18}$ | 190 | 130–145 | 145–155 |
| $C_6F_6$ | 140 | 106 | >185 |

EXAMPLE 3

In order to confirm that the florinated polymers formed "true solutions" in the solvents (consistent with visual observation), rather than dispersions, the viscosity of the dilute solutions was measured. The viscosity data and visual observations indicate a rapid rise in melting temperature with increasing concentration. The dilute solution viscosity measurements (0.5%) and visual observations for the polymer in $C_{14}F_{24}$ indicate solution stability as low as about 50° C.

EXAMPLE 4

The viscosity of a 4% solution of carboxyl polymers having an equivalent weight of 1150 in $C_{14}F_{24}$ was measured at various temperatures. Steady state measurements were made in the constant stress mode using a couette geometry on a Bohlin Contant Stress Rheometer. The solutions were loaded hot into the rheometer preheated to 150° C. First, the solution was cooled in 10° C. increments with the measurements made after several minutes at constant temperature. The viscosities were fairly low (about 0.02 Pa.s) and then increased several orders of magnitude between 120° and 130° C. to about 350 Pa.s. The actual viscosity was higher than this, because the material displayed the characteristics of a soft solid. However, the act of measuring the viscosity partially destroyed this solid structure lowering resistance to flow. This rapid rise in viscosity may be attributed to the onset of crystallization. Heating this gel in the rheometer caused the gel to revert back to its former liquid state. The crystallization temperature was thus estimated to be about 125° C. and the melting temperature was about 143° C. Increasing the polymer concentration to 4% decreases the stability range. At this concentration, the solutions only appear to be stable to about 125° C.

What is claimed is:

1. A composition comprising a solution of a carboxylic fluorinated polymer having an equivalent weight of more than about 900 and containing tetrafluoroethylene units dissolved in a solvent which is selected from the group consisting of (i) a perfluorinated cycloalkane, (ii) perfluorinated aromatic compounds, or (iii) perfluorotrialkylamines; said solvent having a critical temperature of greater than about 150° C.

2. The composition as recited in claim 1 wherein said solvent is a perfluorinated cycloalkane substituted with one or more perfluoroalkyl or perfluoroalkylene groups.

3. The composition as recited in claim 1 wherein said polymer is contains the side chain $OCF_2CF_2OCF_2CF_2COOCH_3$.

4. The composition as recited in claim 1 wherein said solvent is perfluorotetradecahydrophenanthrene perfluoromethylcyclohexane, perfluoro decalin, hexafluorobenzene or perfluorotrihexylamine.

5. The composition as recited in claim 1 wherein said solvent is perfluorotetradecahydrophenanthrene.

* * * * *